(12) United States Patent
Kinpara et al.

(10) Patent No.: US 7,096,561 B2
(45) Date of Patent: Aug. 29, 2006

(54) SEPARATOR PLATE FOR WET-TYPE MULTIPLATE CLUTCH AND WET-TYPE MULTIPLATE CLUTCH PROVIDED WITH SUCH SEPARATOR PLATES

(75) Inventors: Hiroyuki Kinpara, Fukuroi (JP); Masaki Sakabe, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 29 days.

(21) Appl. No.: 10/745,657

(22) Filed: Dec. 29, 2003

(65) Prior Publication Data
US 2004/0134741 A1 Jul. 15, 2004

(30) Foreign Application Priority Data
Dec. 27, 2002 (JP) ............... 2002-378838

(51) Int. Cl.
B23P 25/00 (2006.01)
B23P 17/00 (2006.01)
F16B 13/00 (2006.01)
B24B 1/00 (2006.01)

(52) U.S. Cl. .............. 29/526.4; 29/526.5; 29/557; 29/888; 192/70.14; 451/54; 451/55; 451/56

(58) Field of Classification Search ............ 29/563, 29/888, 526.4, 526.5, 557; 192/70.14, 70.15; 451/54, 56, 55

See application file for complete search history.

(56) References Cited

U.S. PATENT DOCUMENTS 4,516,443 A * 5/1985 Hamano et al. ........... 475/160
4,736,828 A * 4/1988 Diessner ................. 192/58.41
6,311,815 B1   11/2001 Riggle
6,544,632 B1    4/2003 Umezawa et al.

FOREIGN PATENT DOCUMENTS

| JP | 63-043038 | * | 2/1988 |
| JP | 63-049303 | * | 3/1988 |
| JP | 63-084740 | * | 4/1988 |
| JP | 6337023   | * | 12/1994 |

* cited by examiner

Primary Examiner—Eric Compton
(74) Attorney, Agent, or Firm—Crowell & Moring LLP

(57) ABSTRACT

A separator plate useful in a wet-type multiplate clutch is provided on a friction surface thereof with elongated asperities extending with regularity in a predetermined direction. Peak portions of the elongated asperities, said peak portions being to project toward a counterpart member when the separator plate is assembled in the wet-type multiplate clutch, have been removed to form elongated plateaus. The separator plate can be manufactured by fixedly mounting a blank for the separator plate on a work support, forming elongated asperities with regularity in a predetermined direction on one of opposite surfaces of the blank by a grinding wheel, and then removing peak portions of the elongated asperities, said peak portions being to project toward a counterpart member when the separator plate is assembled in the wet-type multiplate clutch, to form elongated plateaus.

4 Claims, 5 Drawing Sheets

X————————X ated asperities extending with regularity in a predetermined direction. Peak portions of the elongated asperities, said peak portions being to project toward a counterpart member when the separator plate is assembled in the wet-type multiplate clutch, have been removed to form elongated plateaus. The present invention also provides a wet-type multiplate clutch which includes a plurality of such separator plates.

SEPARATOR PLATE FOR WET-TYPE MULTIPLATE CLUTCH AND WET-TYPE MULTIPLATE CLUTCH PROVIDED WITH SUCH SEPARATOR PLATES

FIELD OF THE INVENTION

This invention relates to a separator plate for a wet-type multiplate clutch useful in an automatic transmission, and also to a wet-type multiplate clutch provided with such separator plates. The present invention is also concerned with a method for manufacturing such a separator plate.

DESCRIPTION OF THE BACKGROUND

FIG. 1 is a side cross-sectional view showing the basic construction of a wet-type multiplate clutch 10. The drawing shows a clutch case 1, separator plates 2, friction plates 3, and a piston 4 for pressing the separator plates 2 and friction plates 3 toward a stopper ring 5. When pressure oil is introduced into an oil compartment 41 through an oil hole 44, the piston 4 is pressed rightwards as viewed in the drawing. When the pressure oil is drawn, on the other hand, the piston 4 is returned leftwards by a return spring 43 arranged between a piston support 42 and the piston 4. At this time, pressure oil is allowed to enter the oil compartment 41 through an oil hole 45 under centrifugal force, and acts to press the piston 4 back leftwards. Designated at numeral 46 is a stopper ring for the piston support 42.

The separator plates 2 are maintained at outer peripheral splines 25 thereof in fitting engagement with spline grooves 11 of the clutch case 1. Numeral 12 indicates inner peripheral splines of the clutch case 1, and these inner peripheral splines are maintained in fitting engagement with a center shaft (not shown). In the drawing, an alternate long and short dash line X—X indicates a central axis.

FIG. 2 is a front view of the separator plate 2. Numeral 20 indicates a friction surface, and numeral 25 designates the splines formed on the outer periphery.

A wet-type multiplate clutch making use of such conventional separator plates is unavoidably accompanied by an inconvenience that its friction characteristics vary considerably depending on the oil temperature. Especially when the oil temperature is low and the engagement load is also low, a problem arises in that, as will be mentioned subsequently herein, oil films are formed between the separator plates and their associated friction plates to extremely lower the coefficient of friction.

As disclosed in JP 6-337023 A, it was hence proposed to roughen the surface of a separator plate by brushing to form oil grooves between lands, and then to round peak portions of the lands.

The above-described conventional separator plate is, however, still accompanied by the drawback that the peak portions of the lands, said peak portions being to project toward a friction material as its counterpart member when the separator plate is assembled in a wet-type multiplate clutch, unavoidably causes the friction material to wear out, although the peak portions of the lands with oil grooves formed therebetween have been rounded.

SUMMARY OF THE INVENTION

To solve the above-described problems of the conventional art, the present invention, therefore, provides a separator plate useful in a wet-type multiplate clutch. The separator plate is provided on a friction surface thereof with elongated asperities extending with regularity in a predetermined direction. Peak portions of the elongated asperities, said peak portions being to project toward a counterpart member when the separator plate is assembled in the wet-type multiplate clutch, have been removed to form elongated plateaus. The present invention also provides a wet-type multiplate clutch which includes a plurality of such separator plates.

The present invention further provides a method for manufacturing the above-described separator plate. The manufacturing method comprises fixedly mounting a blank for the separator plate on a work support, forming elongated asperities with regularity in a predetermined direction on one of opposite surfaces of the blank by a grinding wheel, and then removing peak portions of the elongated asperities, said peak portions being to project toward a counterpart member when the separator plate is assembled in the wet-type multiplate clutch, to form elongated plateaus.

The separator plate according to the present invention and the wet-type multiplate clutch according to the present invention, said wet-type multiplate clutch being provided with such separator plates, can maintain friction characteristics stable over an extended period, and can also prevent wearing of frictional materials as counterpart members. The manufacturing method according to the present invention can readily and efficiently manufacture the above-described separator plate.

DETAILED DESCRIPTION OF THE INVENTION

The present invention has as a first object thereof to improve the friction characteristics of a wet-type multiplate clutch and also to improve the cooling effect. To achieve the first object, elongated asperities have been formed on the friction surface of a separator by grinding such that the elongated asperities extend with regularity in a predetermined direction.

Peak portions of the elongated asperities arranged as described above, however, involve a problem in that a friction material as their counterpart member is caused to wear out because the peak portions are jagged. Intending as a second object to reduce wearing of the friction material as the counterpart member, to stabilize the friction characteristics and also to maintain the reduction of wearing of the friction material and the stabilized friction characteristics over a long term, the peak portions which project toward the counterpart member when assembled in the wet-type multiplate clutch are removed, for example, by pressing them with a roller to form elongated plateaus.

EXAMPLES

Figure 1:
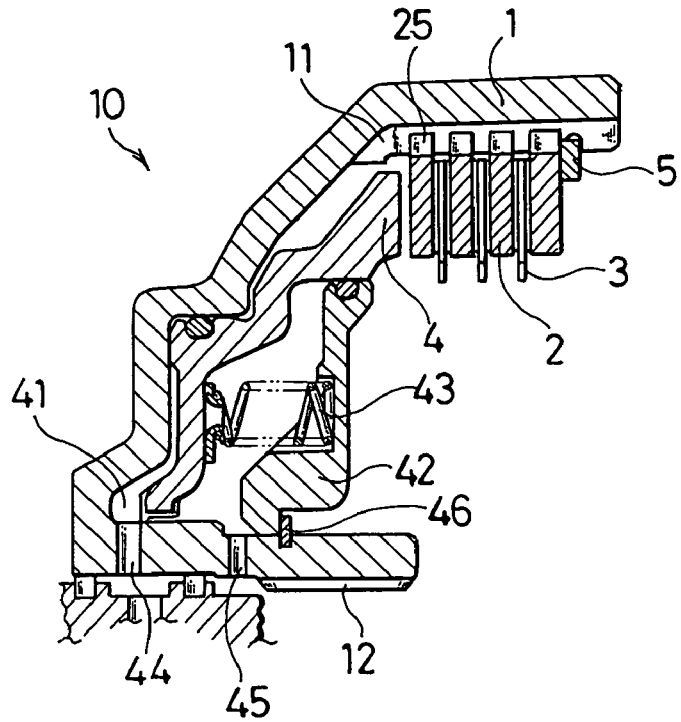
FIG. 1 is a side cross-sectional view showing the construction of a wet-type multiplate clutch.
Figure 2:
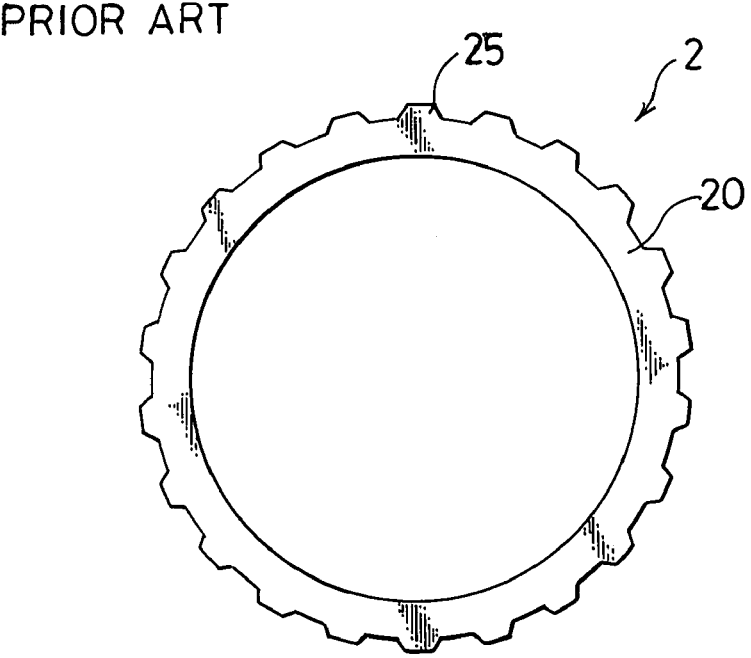
FIG. 2 is a front view of a conventional separator plate.
Figure 3:
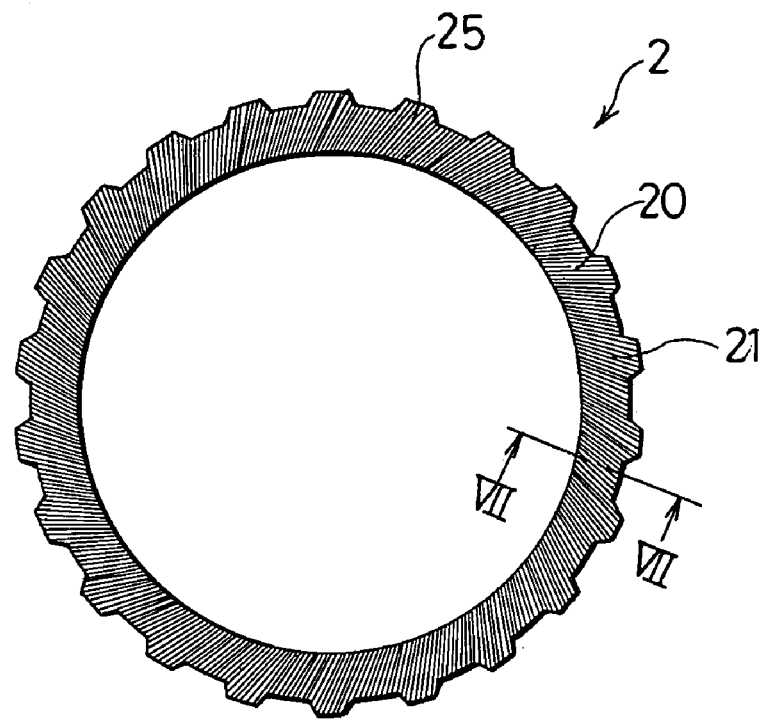
FIG. 3 is a front view of a separator plate according to a first embodiment of the present invention.
Figure 4:
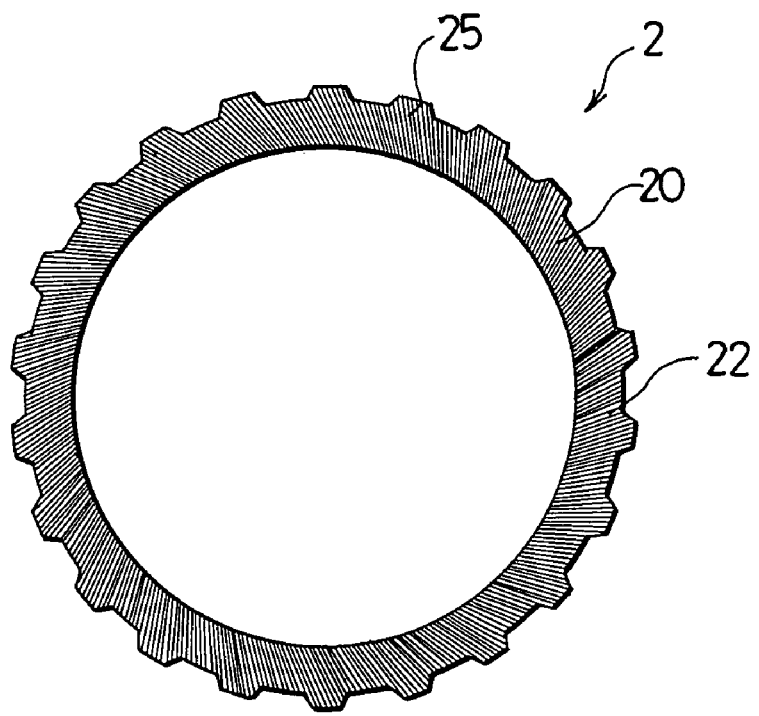
FIG. 4 is a front view of a separator plate according to a second embodiment of the present invention.
Figure 5:
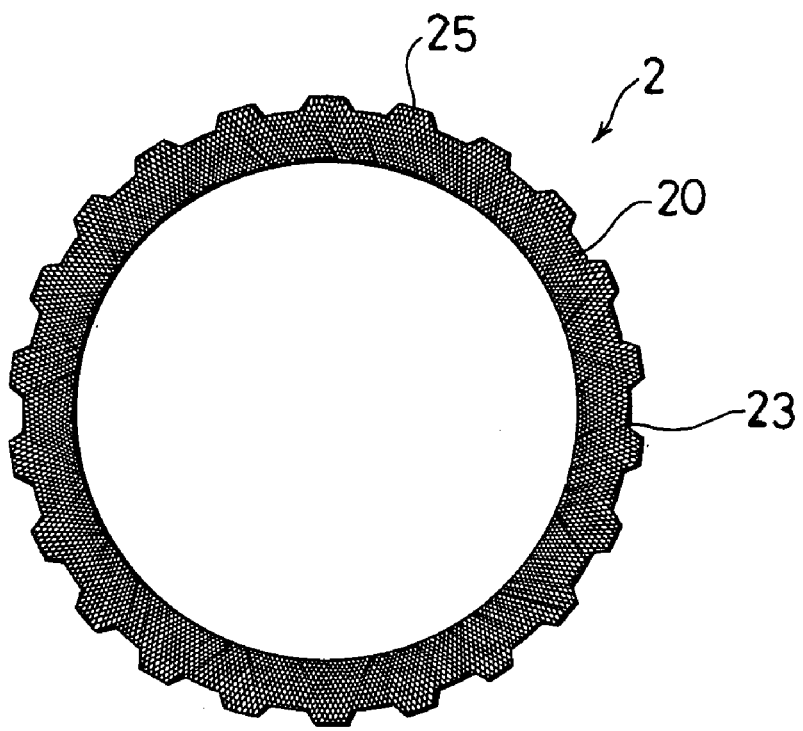
FIG. 5 is a front view of a separator plate according to a third embodiment of the present invention.

FIG. 3 illustrates the separator plate 2 according to the first embodiment of the present invention. Elongated asperities 21 are formed on a friction surface 20 such that the elongated asperities 21 are tilted in a clockwise direction. FIG. 4 depicts the separator plate 2 according to the second embodiment of the present invention. Elongated asperities 22 are formed on a friction surface 20 such that the elongated asperities 21 are tilted in a couterclockwise direction. Further, FIG. 5 shows the separator plate 2 according to the third embodiment of the present invention. The separator plate 2 according to the third embodiment is provided on a friction surface 20 thereof with asperities 23 formed in a crosshatch pattern. These asperities 23 can be formed by cutting valleys on the friction surface 20 at predetermined intervals and at a predetermined angle, for example, 90° with respect to the inclined angle of the elongated asperities 21 or 22. In each of FIGS. 3 through 5, numeral 25 indicates splines formed on the outer periphery of the separator plate.

The asperities or elongated asperities in each of the above-described first to third embodiments can be formed preferably by grinding. Between these asperities or elongated asperities, oil can be held to enhance the cooling effect.

Figure 6:
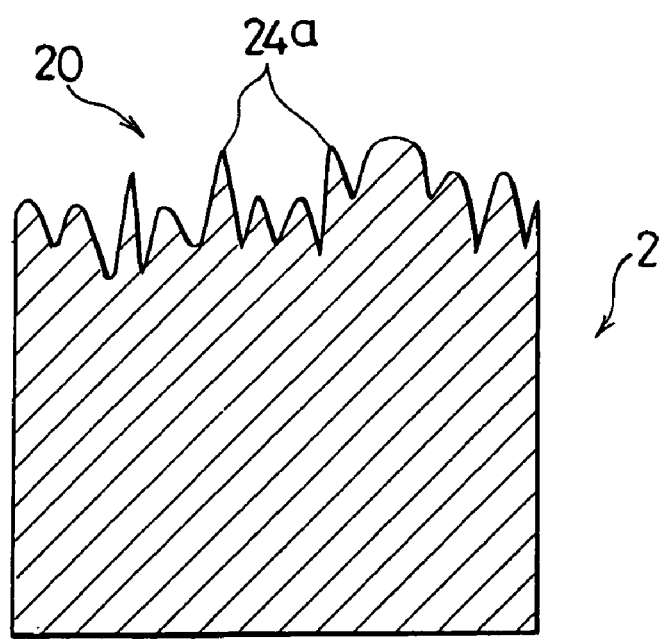
FIG. 6 is a cross-sectional view, which corresponds to one taken along line VII—VII of FIG. 3 and shows on an enlarged scale a friction surface of a separator plate with elongated asperities formed thereon.

FIG. 6 illustrates on an enlarge scale the friction surface 20 of the separator plate 2 (FIG. 6 corresponds, for example, to a view taken along line VII—VII of FIG. 3). Sign 24a indicates peak portions of the elongated asperities formed on the friction surface 20 and, when the separator plate is arranged in a wet-type multiplate clutch, these peak portions project toward their counterpart member. As these jagged peak portions 24a involve the problem that they cause the friction material, their counterpart member, to wear out, it is necessary to remove these jagged peak portions 24a, for example, by pressing them with a roller such that elongated plateaus are formed.

Figure 7:
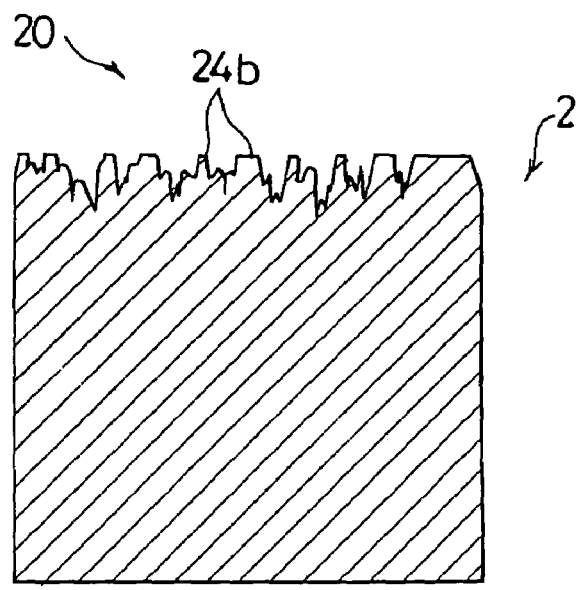
FIG. 7 is a cross-sectional view taken along line VII—VII of FIG. 3, is similar to FIG. 6, and illustrates the friction surface after peak portions of the elongated asperities have been removed.

FIG. 7 is the cross-sectional view taken along line VII—VII of FIG. 3, and shows the friction surface 20 after the peak portions 24a have been removed. Designated at sign 24b are elongated plateaus which have been formed by removing the peak portions 24a from the elongated asperities to present substantially flat tops.

On a rugged surface, a percentage of a given slice level over the entire surface is called "plateau ratio". In the present invention, the heights of the elongated plateaus in FIG. 7 can preferably be from 0.1 to 3 μm in a plateau ratio range of from 5 to 60%. A plateau height lower than 0.1 μm requires difficult machining, for example, difficult grinding, and further, can hardly hold oil, so that the performance intended by the present invention may not be exhibited. A plateau height taller than 3 μm, on the other hand, has a potential problem that friction material as the counterpart member may be damaged.

Figure 8:
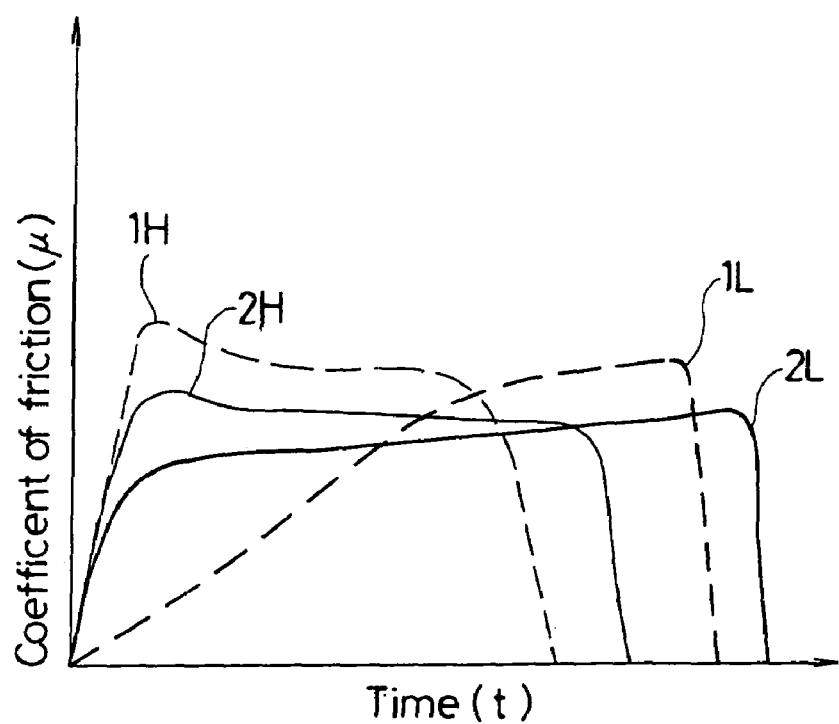
FIG. 8 is a graph comparing separator plates according to the present invention with conventional separator plates in friction characteristics when the engagement load was low.
Figure 9:
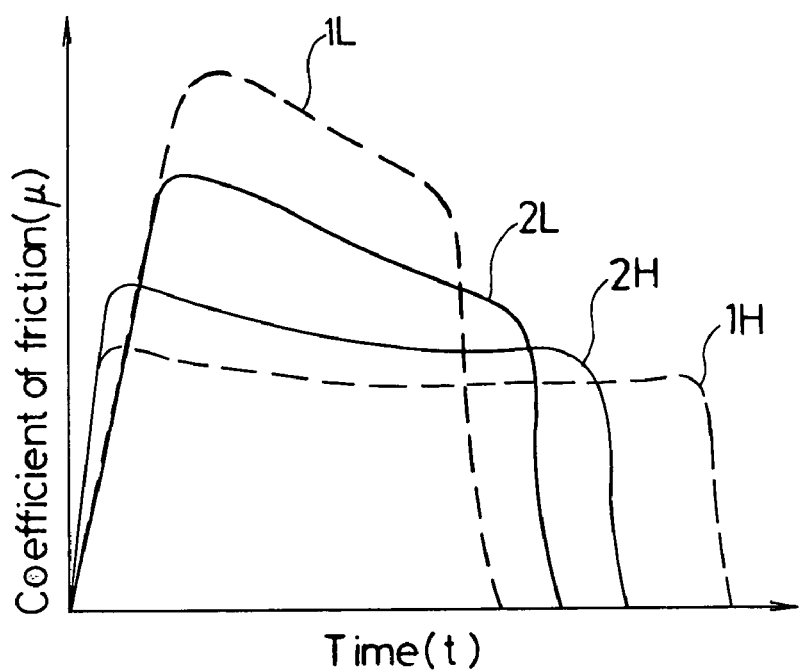
FIG. 9 is a graph similar to the graph of FIG. 8, and compares the separator plates according to the present invention with the conventional separator plates in friction characteristics when the engagement load was high.

In FIG. 8 and FIG. 9, graphs comparing in friction characteristics between the present invention and the conventional art are shown. In each of these drawings, coefficients of friction (μ) are plotted along the ordinates, and time (t) is plotted along the abscissa. FIG. 8 corresponds to a low engagement load, while FIG. 9 corresponds to a high engagement load. In both of these drawings, the conventional product is shown by broken lines.

When the engagement load is low as shown in FIG. 8, the oil viscosity is low at a low oil temperature. With the conventional separator plates, oil films are therefore formed on their friction surfaces so that, as shown in FIG. 8, the initial coefficient of friction becomes extremely low. Incidentally, "1L" indicates the coefficient of friction of the conventional separator plates when the oil temperature was low, "1H" indicates the coefficient of friction of the conventional separator plates when the oil temperature was high, "2L" indicates the coefficient of friction of the invention separator plates when the oil temperature was low, and "2H" indicates the coefficient of friction of the invention separator plates when the oil temperature was high.

FIG. 9 corresponds to the high engagement load. In the drawing, "1L" indicates the coefficient of friction of the conventional separator plates when the oil temperature was low, "1H" indicates the coefficient of friction of the conventional separator plates when the oil temperature was high, "2L" indicates the coefficient of friction of the invention separator plates when the oil temperature was low, and "2H" indicates the coefficient of friction of the invention separator plates when the oil temperature was high.

Compared with conventional separator plates, the separator plates of the present invention exhibit smaller differences between their friction characteristic when the oil temperature is high and their friction characteristics when the oil temperature is low, and can stabilize their friction characteristics over a long term.

Figure 10:
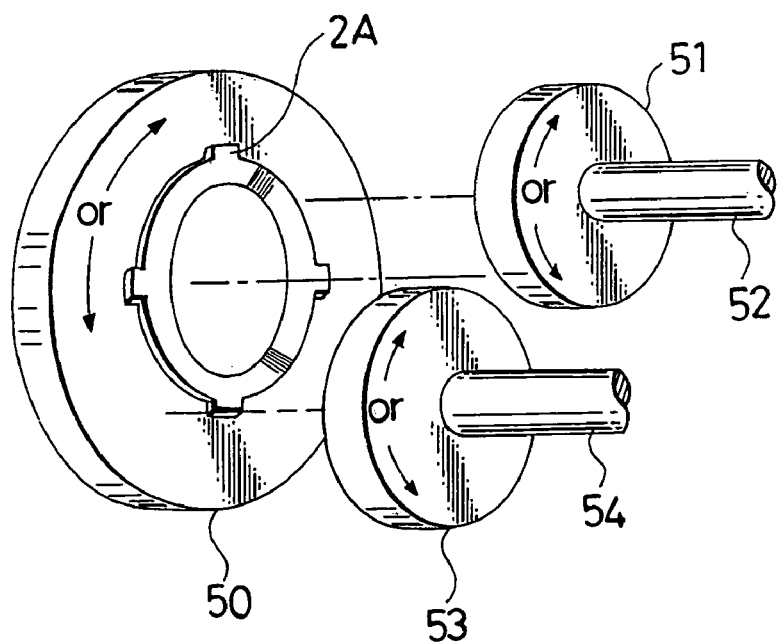
FIG. 10 is a simplified schematic view illustrating one embodiment of the method according to the present invention for the manufacture of a separator plate.

With reference to FIG. 10, a description will next be made about a method according to one embodiment of the present invention for the manufacture of a separator plate, specifically a separator plate according to the present invention, for example, the separator plate according to the first embodiment of the present invention as shown in FIG. 3.

The formation of the elongated asperities is performed by grinding work. In a grinding and pressing apparatus illustrated by way of example in FIG. 10, a grinding wheel 51 is arranged relative to a work support 50 such that a rotatable shaft 52 of the grinding wheel 51 is shifted from a central axis of the work support 50. The work support 50 and grinding wheel 51 are each selectively rotatable in either a clockwise direction or a counterclockwise direction. To form elongated asperities on one of opposite surfaces of a blank 2A for the separator plate 2, the blank 2A is fixedly mounted on the work support 50 and then, the work support 50 is rotated, for example, in the clockwise direction. The grinding wheel 51 is next moved toward the work support 50 while rotating the grinding wheel 51, for example, in the counterclockwise direction. A surface of the grinding wheel 51, which is facing the work support 50 and carries grids embedded or otherwise held thereon, is pressed under a predetermined pressure against the blank 2A to form the elongated asperities.

To remove jagged peak portions of the elongated asperities (see FIG. 6 and FIG. 7), a roller 53 is used. Like the grinding wheel 51, the roller 53 is arranged relative to the work support 50 such that a rotatable shaft 54 of the roller 53 is shifted from the central axis of the work support 50. In the illustrated grinding and pressing apparatus, the grinding wheel 51 and the roller 53 are arranged at diametrically opposite positions relative to the central axis of the work support 50. The work support 50 is rotated, for example, in the clockwise direction, and then, the roller 53 is moved toward the work support 50 while rotating the roller 53, for example, in the counterclockwise direction. A surface of the roller 53, which is facing the work support 50, is pressed under a predetermined pressure against the elongated asperities to remove their jagged peak portions.

To form asperities in a crosshatch pattern on one of opposite surfaces of a separator plate as shown in FIG. 5, grinding work may be performed again with the direction of rotation of the grinding wheel 51 being reversed. Preferably, however, the roller 53 is replaced by a second grinding wheel to cut valleys in the one surface at predetermined intervals and at a predetermined angle with respect to the direction of the elongated asperities such that the surface is provided with the asperities arranged in the crosshatch pattern. The use of the second grinding wheel assures better work efficiency, because in the above-described manner, a number of separator plates are machined successively. The second grinding wheel is then replaced by the roller 53 to remove jagged top portions of the asperities such that plateaus are formed in the crosshatch pattern.

Needless to say, the particle size and density of grits on each of the grinding wheels, the rotation speeds and directions of the work support and grinding wheel(s), and the pressing forces of the grinding wheel(s) and roller have to be determined in view of the desired dimensions and spacings of the elongated asperities and elongated plateaus or of the asperities and plateaus.

This application claims the priority of Japanese Patent Application 2002-378838 filed Dec. 27, 2002, which is incorporated herein by reference.

The invention claimed is:

1. A method for manufacturing a separator plate adapted to contact a counterpart friction plate in a wet-type multi-plate clutch, the method comprising the acts of:
    fixedly mounting a blank for the separator plate on a work support;
    grinding the blank for the separator plate to form elongated asperities extending with regularity in at least one predetermined direction on one of opposite surfaces of the blank that forms a friction surface of the separator plate, the grinding act being performed with a grinding wheel, wherein peak portions of the elongated asperities are formed to project toward the counterpart friction plate in the wet-type multiplate clutch; and
    pressing a roller against the elongated asperities to remove the peak portions thereof to form elongated plateaus on the one surface forming the friction surface of the separator plate, wherein the elongated plateaus form substantially flat tops which contact the counterpart friction plate when used in the wet-type multiplate clutch.

2. The method for manufacturing a separator plate according to claim 1, wherein said elongated asperities have heights of from 0.1 to 3 µm at a plateau ratio of from 5 to 60%.

3. A method for manufacturing a separator plate adapted to contact a counterpart friction plate in a wet-type multi-plate clutch, the method comprising the acts of:
    fixedly mounting a blank for the separator plate on a work support;
    grinding the blank for the separator plate to form elongated asperities extending with regularity in a predetermined direction on one of opposite surfaces of the blank that forms a friction surface of the separator plate, the grinding act being performed with a grinding wheel, wherein peak portions of the elongated asperities are formed to project toward the counterpart friction plate in the wet-type multiplate clutch;
    cutting valleys on the one surface at predetermined intervals and at a predetermined angle with respect to the predetermined direction of the elongated asperities to produce a cross-hatch pattern of the asperities on the one surface, the cutting act being performed by another grinding wheel; and
    pressing a roller against the elongated asperities to remove the peak portions thereof to form a cross-hatched pattern of elongated plateaus on the one surface forming the friction surface of the separator plate, wherein the elongated plateaus form substantially flat tops which contact the counterpart friction plate when used in the wet-type multiplate clutch.

4. The method for manufacturing a separator plate according to claim 3, wherein said elongated asperities have heights of from 0.1 to 3 µm at a plateau ratio of from 5 to 60%.

* * * * *